(12) United States Patent
Youn et al.

(10) Patent No.: US 9,139,723 B2
(45) Date of Patent: Sep. 22, 2015

(54) POLYPROPYLENE RESIN COMPOSITION

(71) Applicants: Hyundai Motor Company, Seoul (KR); Kia Motors Corporation, Seoul (KR)

(72) Inventors: Jee-Young Youn, Incheon (KR); Hyeok-Jung Lim, Bucheon-si (KR)

(73) Assignees: HYUNDAI MOTOR COMPANY, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 14/135,181

(22) Filed: Dec. 19, 2013

(65) Prior Publication Data

US 2014/0329955 A1    Nov. 6, 2014

(30) Foreign Application Priority Data

May 6, 2013    (KR) .................. 10-2013-0050404

(51) Int. Cl.
*C08L 23/12* (2006.01)
*C08K 7/14* (2006.01)
*C08L 51/06* (2006.01)

(52) U.S. Cl.
CPC . *C08L 23/12* (2013.01); *C08K 7/14* (2013.01); *C08L 2205/03* (2013.01); *C08L 2205/035* (2013.01)

(58) Field of Classification Search
CPC ............... C08L 23/10; C08L 2205/03; C08L 2205/035; C08L 51/06; C08K 7/14
USPC ............ 525/89, 217, 240; 524/492, 504, 505, 524/582

See application file for complete search history.

(56) References Cited

U.S. PATENT DOCUMENTS

2007/0135547 A1    6/2007    Chundury et al.

FOREIGN PATENT DOCUMENTS

| JP | 2000-160623 A | 6/2000 |
| KR | 10-2004-0065108 A | 7/2004 |
| KR | 10-2008-0061077 A | 7/2008 |

*Primary Examiner* — Nathan M Nutter
(74) *Attorney, Agent, or Firm* — McDermott Will & Emery LLP

(57) ABSTRACT

A polypropylene resin composition includes 1 to 30 wt % of homopolypropylene having a melt index of 2 to 6 g/10 min at 230° C. and 2.16 kg, and an isotacticity index of 97% or more, 1 to 40 wt % of homopolypropylene having a melt index of 16 to 22 g/10 min at 230° C. and 2.16 kg, and an isotacticity index of 96% or more, and 20 to 40 wt % of a glass fiber having an excellent rigidity supplementation effect as an inorganic filler for improving heat resistance, mechanical properties, and 1 to 10 wt % of denatured polypropylene as a compatibilizer maximizes compatibility of the polypropylene resin and the glass fiber, based on a total weight of the composition. The composition has excellent rigidity, short-term heat resistance, long-term heat resistance, and fusion strength, at a reduced weight and production cost.

4 Claims, 3 Drawing Sheets

POLYPROPYLENE RESIN COMPOSITION

CROSS-REFERENCE TO RELATED APPLICATIONS

This application claims priority under 35 U.S.C. §119 to Korean Patent Application No. 10-2013-0050404, filed on May 6, 2013, in the Korean Intellectual Property Office, the disclosure of which is incorporated herein by reference in its entirety.

TECHNICAL FIELD

The present disclosure relates to a polypropylene resin composition, and more particularly, to a polypropylene resin composition including high crystalline polypropylene, a glass fiber, denatured polypropylene having excellent properties, such as rigidity and heat resistance.

BACKGROUND

Generally, parts in an engine compartment of a vehicle need excellent rigidity in order to support the vehicle and excellent heat resistance in order to endure the high temperature of the engine, therefore engineering plastics, such as nylon, have been used in the related art.

For example, the most commonly used plastic used as a suction manifold in the engine compartment of the vehicle is a nylon resin composition. Nylon resin has relatively excellent rigidity, and the rigidity may be further supplemented by adding an inorganic material. Resin compositions having various rigidities can be manufactured by combining glass fibers (GF) and using the polarity of the nylon resin itself.

However, even though the nylon resin has excellent physical properties, since specific gravity and prime cost of the material are higher than those of a general plastic material, such as a polypropylene resin, parts made of the nylon resin are heavy and increase production cost.

Therefore, in accordance with a demand for developing a polypropylene resin composition which facilitates a reduction in weight and cost, and has excellent rigidity and heat resistance, a development method of a material in which an inorganic filler or the other resin is combined with the polypropylene resin has been proposed.

Korean Patent Application Laid-Open No. 2003-56188 discloses a method of manufacturing a polypropylene resin composition which includes 36.0 to 78.0 wt % of polypropylene, 10.0 to 30.0 wt % of nylon, 10.0 to 30.0 wt % of a glass fiber, 1.0 to 4.0 wt % of denatured polypropylene as a compatibilizer, and 0.01 to 2.0 wt % of an organic silane-based compound to improve strength and heat resistance. However, the rigidity and impact strength are not sufficiently high enough in the aforementioned technology.

SUMMARY

A polypropylene resin composition according to the present disclosure has excellent rigidity, short-term and long-term heat resistance, and fusion strength. The polypropylene resin composition facilitates a reduction in weight and has an economic benefit provided by adding a glass fiber, having an excellent rigidity supplementation effect, as an inorganic filler for improved rigidity, heat resistance, and mechanical properties, etc. A high crystalline polypropylene resin that is cheaper than a polyamide resin in the related art is provided. Denatured polypropylene as a compatibilizer for maximizing compatibility of the high crystalline polypropylene resin and the glass fiber can be added for further improvement.

According to an exemplary embodiment of the present disclosure, a polypropylene resin composition includes 1 to 30 wt % of homopolypropylene having a melt index of 2 to 6 g/10 min at 230° C. and 2.16 kg, and an isotacticity index of 97% or more, 1 to 40 wt % of homopolypropylene having a melt index of 16 to 22 g/10 min at 230° C. 2.16 kg and an isotacticity index of 96% or more, 20 to 40 wt % of a glass fiber, and 1 to 10 wt % of denatured polypropylene. The wt % are based on the total weight of the composition.

The polypropylene resin composition may further include 20 wt % or less of homopolypropylene having a melt index of 8 to 12 g/10 min at 230° C. and 2.16 kg, and an isotacticity index of 96% or more, 30 wt % or less of a block polypropylene copolymer having a melt index of 6 to 10 g/10 min at 230° C. and 2.16 kg, and an isotacticity index of 96%, and 30 wt % or less of the block polypropylene copolymer having a melt index of 8 to 12 g/10 min at 230° C. and 2.16 kg, and an isotacticity index of 96%. The wt % are based on the total weight of the composition.

The polypropylene resin composition may further include 1 to 10 wt % of nylon 6, 0.3 to 0.5 wt % of an antioxidant, 0.3 to 0.5 wt % of a heat resistant stabilizer, and 0.2 to 0.4 wt % of a lubricant. The wt % are based on the total weight of the composition.

As set forth in this disclosure, denatured polypropylene may be polypropylene (PP-graft-MA) on which maleic anhydride is grafted.

The present disclosure having the aforementioned constitution provides excellent rigidity, short-term and long-term heat resistance, fusion rigidity, and the like by including high crystalline polypropylene, and a glass fiber, thereby reducing weight and production cost.

DETAILED DESCRIPTION

Figure 1:
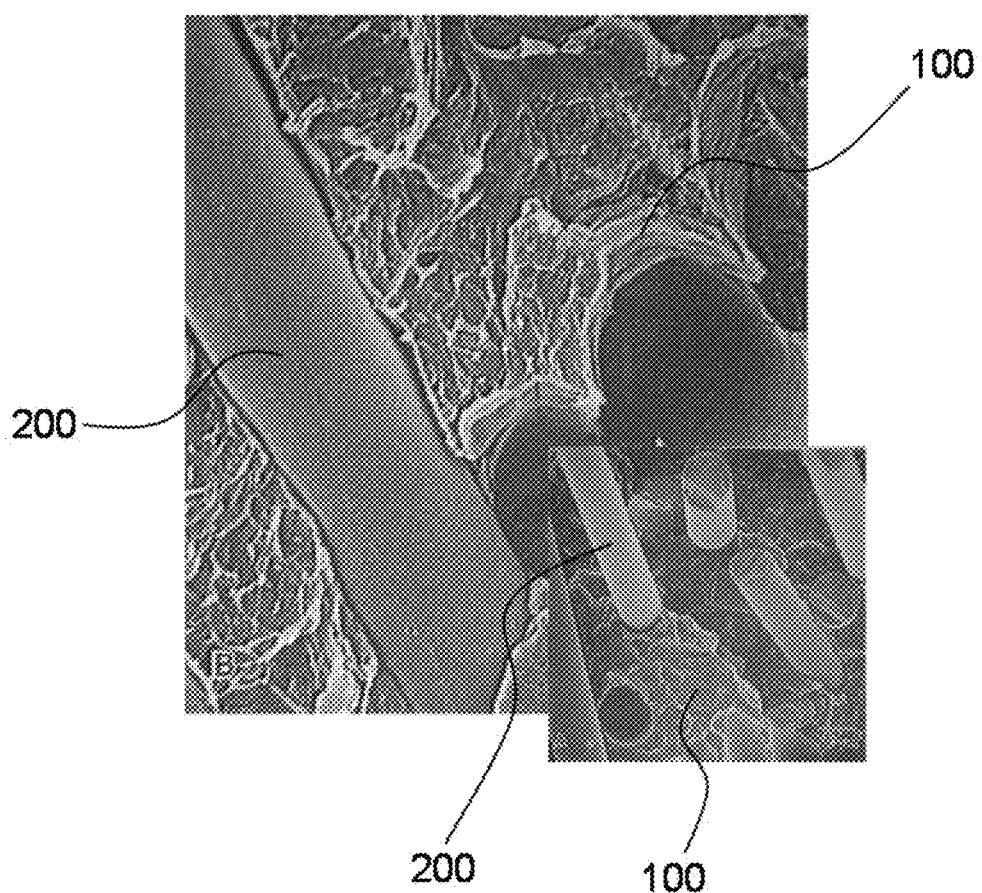
FIG. 1 is a picture illustrating an interfacial state of a polypropylene resin and a glass fiber in a state where a compatibilizer is not included.

Terms or words used in the present specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own inventive concept in the best manner.

Hereinafter, the present disclosure will be described in detail based on Tables and drawings.

The present disclosure relates to a polypropylene resin composition.

An aspect of the present disclosure provides excellent rigidity, short-term and long-term heat resistance, and fusion rigidity and with reduced weight and cost. A polypropylene resin composition according to an exemplary embodiment of present disclosure includes main components, such as 1 to 30 wt % of homopolypropylene having a melt index of 2 to 6 g/10 min at 230° C. and 2.16 kg, and an isotacticity index of 97% or more, 1 to 40 wt % of homopolypropylene having a melt index of 16 to 22 g/10 min at 230° C. and 2.16 kg, and an isotacticity index of 96% or more, 20 to 40 wt % of a glass fiber, and 1 to 10 wt % of denatured polypropylene, based on the total weight of the composition.

In addition to the main components, the present composition may include 20 wt % or less of homopolypropylene having a melt index of 8 to 12 g/10 min at 230° C. and 2.16 kg, and an isotacticity index of 96% or more, 30 wt % or less of a block polypropylene copolymer having a melt index of 6 to 10 g/10 min at 230° C. and 2.16 kg, and an isotacticity index of 96%, 30 wt % or less of the block polypropylene copolymer having a melt index of 8 to 12 g/10 min at 230° C. and 2.16 kg, and an isotacticity index of 96%, and the like, as optional components.

A polypropylene resin composition according to an exemplary embodiment of present disclosure may further include 1 to 10 wt % of nylon 6, 0.3 to 0.5 wt %, of an antioxidant, 0.3 to 0.5 wt % of a heat resistant stabilizer, 0.2 to 0.4 wt % of a lubricant, and the like, as the optional components. Various kinds of general additives such as a weather proof stabilizer, a stiffener, an antistatic agent, a slip agent, a nucleating agent, a flame retardant, a pigment, and a dye may further be disclosed.

Hereinafter, a constitution component and a content of the present composition will be more specifically described.

1. Constitution Component (1) High Crystalline Polypropylene Resin

The high crystalline polypropylene resin is a base of the present composition. Homopolypropylene and the like and block polypropylene copolymer and the like may be further included.

High crystalline polypropylene resin may be a mixture of homopolypropylene having a melt index of 2 to 6 g/10 min at 230° C. and 2.16 kg, and an isotacticity index of 97% or more and homopolypropylene having a melt index of 16 to 22 g/10 min at 230° C. and 2.16 kg, and an isotacticity index of 96% or more.

Herein, the content of 1 to 30 wt % of homopolypropylene may include a melt index of 2 to 6 g/10 min at 230° C. and 2.16 kg, and an isotacticity index of 97% or more. In a case where the melt index is less than 2 g/10 min at 230° C. and 2.16 kg, moldability of the composition is not favorable, thus productivity may be reduced. When the melt index is more than 6 g/10 min at 230° C. and 2.16 kg, impact rigidity of the composition may be rapidly reduced. In addition, in a case where the content of homopolypropylene is less than 1 wt %, it may be difficult to perform injection molding, such as extrusion and processing of the composition. When the content is more than 30 wt %, a physical property improvement effect of the composition may be reduced due to a reduction in content of other added components.

Further, the content of homopolypropylene may have a melt index of 16 to 22 g/10 min at 230° C. and 2.16 kg, and an isotacticity index of 96% or more to be 1 to 40 wt %. In a case where the melt index is less than 16 g/10 min at 230° C. and 2.16 kg, as described above, moldability of the composition is not favorable, thus productivity may be reduced. In a case where the melt index is more than 22 g/10 min at 230° C. and 2.16 kg, impact rigidity of the composition may be rapidly reduced. Likewise, when the content of homopolypropylene is less than 1 wt %, it may be difficult to perform injection molding such as extrusion and processing of the composition. When the content is more than 40 wt %, the physical property improvement effect of the composition may be reduced due to a reduction in content of other added components.

The present composition may further include 20 wt % or less of homopolypropylene having a melt index of 8 to 12 g/10 min at 230° C. and 2.16 kg, and an isotacticity index of 96% or more. The composition may further include 30 wt % or less of the block polypropylene copolymer having a melt index of 6 to 10 g/10 min at 230° C. and 2.16 kg, and an isotacticity index of 96%, in which the content of xylene soluble-ethylene propylene rubber (EPR) is 12 to 16%, 30 wt % or less of the block polypropylene copolymer having a melt index of 8 to 12 g/10 min at 230° C. and 2.16 kg, and an isotacticity index of 96%, in which the content of the xylene soluble-ethylene propylene rubber (EPR) is 12 to 16%, and the like, based on the total weight of the composition. The isotacticity index of the present disclosure may be a value obtained by an NMR measurement method.

(2) Glass Fiber

The glass fiber has an alignment effect by an aspect ratio, which is larger than that of a plate type or sphere type filler, and thus the present disclosure may include the glass fiber as an inorganic filler for improving rigidity, heat resistance, mechanical properties, and the like, of the composition after injection molding. Any matter known in the art may be used as the glass fiber, and any matter can be used as long as the matter can be commercially purchased without a length limitation.

The content of the glass fiber may be 20 to 40 wt % based on the total weight of the composition. In the case where the content of the glass fiber is less than 20 wt %, an increase in rigidity, heat resistance, and mechanical properties of the composition may be insufficient. In the case where the content is more than 40 wt %, a warpage phenomenon and the like may occur in a final molded product due to a shrinkage difference between a flow direction inevitably caused by a high alignment property of the glass fiber and a direction that is orthogonal to the flow direction. Therefore, an aesthetic appearance of the final molded product may not be favorable.

(3) Denatured Polypropylene

Denatured polypropylene is a compatibilizer containing a separate polar group. Denatured polypropylene may be polypropylene (PP-graft-MA) on which maleic anhydride is grafted. Since denatured polypropylene increases adhesion force between interfaces of the polypropylene resin and the glass fiber, physical properties such as impact resistance and elongation of the composition can be improved.

Figure 2:
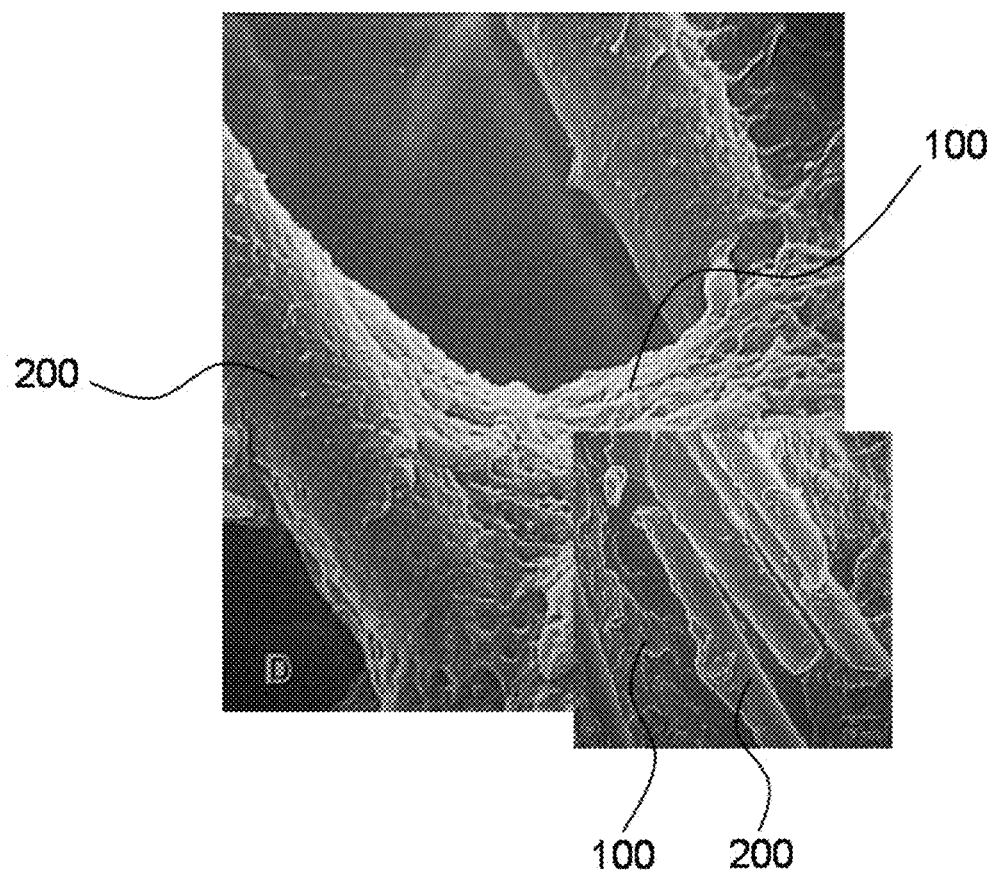
FIG. 2 is a picture illustrating the interfacial state of the polypropylene resin and the glass fiber in a state where the compatibilizer is included.

FIG. 1 is a picture illustrating an interfacial state of the polypropylene resin and the glass fiber without compatibilizer, and FIG. 2 is a picture illustrating the interfacial state of the polypropylene resin and the glass fiber with compatibilizer. FIG. 1 illustrates that when the compatibilizer is not included adhesion of a polypropylene resin 100 and a glass fiber 200 is not sufficient, and the polypropylene resin 100 and the glass fiber 200 are separated from each other. FIG. 2 illustrates that adhesion of the polypropylene resin 100 and the glass fiber 200 is sufficient, and thus the polypropylene resin 100 and the glass fiber 200 are firmly tangled with each other.

The melt index of denatured polypropylene may be 80 to 120 g/10 min at 230° C. and 2.16 kg, and a fraction of maleic anhydride may be 0.5 to 1.5% as measured by a FT-IR method.

Further, the content of denatured polypropylene may be 1 to 10 wt % based on the total weight of the composition. In a case where the content of denatured polypropylene is less than 1 wt %, since adhesion force between the interfaces of the glass fiber and the polypropylene resin may not be sufficiently improved, a physical property improvement may be reduced. In a case where the content is more than 10 wt % and the denatured polypropylene is saturated, even with adding more denatured polypropylene, physical properties may not further be improved.

(4) Nylon 6

The composition can have ultra-high rigidity and high heat resistance by adding nylon 6 to the polypropylene resin composition. Further, since nylon 6 has both a polar group and a non-polar group, nylon 6 improves and assists the function of denatured polypropylene to increase rigidity of the composition as a compatibilizer.

In the present composition, one or more selected from the group consisting of nylon 6, nylon 66, nylon 6/66, nylon 4, nylon 5, nylon 610, nylon 11, nylon 12, and the like, may be included instead of nylon 6.

Meanwhile, the content of nylon 6 may be 1 to 10 wt % based on the total weight of the composition. In a case where the content of nylon 6 is less than 1 wt %, the physical property improvement effect may not be sufficient, and when the content is more than 10 wt %, a phase separation of nylon 6 and the polypropylene resin may increase to reduce the physical property improvement effect.

(5) Antioxidant

The antioxidant suppresses a deterioration reaction by oxidation of the composition during extrusion and injection processing, and the content thereof may be 0.3 to 0.5 wt % based on the total weight of the composition. In a case where the content of the antioxidant is less than 0.3 wt %, physical properties of the composition may be reduced, and in the case where the content is more than 0.5 wt %, a problem may occur in an aesthetic aspect of the composition.

(6) Heat Resistant Stabilizer

The heat resistant stabilizer maintains long-term heat resistance of the composition. The content thereof may be 0.3 to 0.5 wt % based on the total weight of the composition. In a case where the content of the heat resistant stabilizer is less than 0.3 wt %, there is no heat resistance maintenance effect, and when the content is more than 0.5 wt %, a heat resistance effect may be saturated to reduce economic efficiency.

(7) Lubricant

The lubricant neutralizes a residue of a catalyst remained when the polypropylene resin is polymerized and performs a lubricating function to the composition to smoothly induce processing such as extrusion and injection. Further, the content of the lubricant may be 0.2 to 0.4 wt % based on the total weight of the composition. In a case where the content of the lubricant is less than 0.2 wt %, a sufficient lubricating function cannot be performed, and when the content is more than 0.4 wt %, moldability of the composition may be reduced.

2. Use

The present disclosure is applied preferably to a matter requiring excellent rigidity and heat resistance and an effect of reduced weight and cost, more preferably to structures and parts for vehicles, and the like, and to a suction manifold of a vehicle.

3. Manufacturing Method

Hereinafter, the present disclosure relates to a polypropylene resin composition in another aspect.

The polypropylene resin composition can be appropriately manufactured by the person with ordinary skill in the art with reference to a known technology. Specifically, the polypropylene resin composition is manufactured so as to include 1 to 30 wt % of homopolypropylene having a melt index of 2 to 6 g/10 min at 230° C. and 2.16 kg, and an isotacticity index of 97% or more, 1 to 40 wt % of homopolypropylene having a melt index of 16 to 22 g/10 min at 230° C. and 2.16 kg, and an isotacticity index of 96% or more, 20 to 40 wt % of a glass fiber, and 1 to 10 wt % of denatured polypropylene. The wt % are based on a total weight of the composition.

Hereinafter, the present disclosure will be described in more detail through the examples. The examples are only for illustrating the present disclosure, and it will be obvious to those skilled in the art that the scope of the present disclosure is not interpreted to be limited by these Examples.

Example

The sample was manufactured based on the constitution components and the contents of the following Table 1, test results of rigidity and short-term heat resistance are described in the following Table 2. Test results of long-term heat resistance and fusion rigidity are described in the following Table 3.

TABLE 1

| Classification | Unit | Comparative Example 1 | Comparative Example 2 | Comparative Example 3 | Example 1 | Example 2 | Example 3 | Example 4 |
|---|---|---|---|---|---|---|---|---|
| PP Homo-1 | wt % | 65 | 50 | — | — | — | — | — |
| PP Homo-2 | wt % | — | — | 30 | 27 | 25 | — | 50 |
| PP Homo-3 | wt % | — | — | 35 | 40 | 35 | 30 | — |
| PP Block-1 | wt % | — | 15 | — | — | — | — | — |
| PP Block-2 | wt % | — | — | — | — | — | 30 | — |
| nylon 6 | wt % | — | — | — | — | — | — | 8 |
| PP-g-MA | wt % | — | — | — | 3 | 5 | 5 | 7 |
| Glass fiber | wt % | 35 | 35 | 35 | 30 | 35 | 35 | 35 |

PP Homo-1: High crystalline polypropylene resin having a melt index of 8 to 12 g/10 min (230° C., 2.16 kg) and an isotacticity index of 96% or more
PP Homo-2: High crystalline polypropylene resin having a melt index of 2 to 6 g/10 min (230° C., 2.16 kg) and an isotacticity index of 97% or more
PP Homo-3: High crystalline polypropylene resin having a melt index of 16 to 22 g/10 min (230° C., 2.16 kg) and an isotacticity index of 96% or more
PP Block-1: Copolymerized polypropylene having a melt index of 6 to 10 g/10 min (230° C., 2.16 kg) and an isotacticity index of 96% or more, in which the content of the xylene-soluble ethylene propylene rubber (EPR) is at a level of 12 to 16%
PP Block-2: Copolymerized polypropylene having a melt index of 8 to 12 g/10 min (230° C., 2.16 kg) and an isotacticity index of 96% or more, in which the content of the xylene-soluble ethylene propylene rubber (EPR) is at a level of 12 to 16%
PP-g-MA: Polypropylene having a melt index of 80 to 120 g/10 min (230° C., 2.16 kg), on which maleic anhydride having a fraction of maleic anhydride of 0.5 to 1.5% measured by a FT-IR method is grafted Table 1 is a table where the constitution components and the contents for manufacturing the samples of the Comparative Examples and the Examples are described.

TABLE 2

| Classification | Unit | Comparative Example 1 | Comparative Example 2 | Comparative Example 3 | Example 1 | Example 2 | Example 3 | Example 4 |
|---|---|---|---|---|---|---|---|---|
| Melt index | g/10 min (230° C., 2.16 kg) | 5.2 | 4.2 | 3.8 | 3.5 | 4.1 | 4.4 | 3.2 |
| Density | g/cm$^3$ | 1.16 | 1.16 | 1.15 | 1.12 | 1.15 | 1.15 | 1.18 |
| Tensile strength | MPa | 97 | 90 | 102 | 99 | 102 | 100 | 107 |
| Bending modulus of elasticity | MPa | 6,230 | 5,450 | 6,680 | 6,420 | 6,950 | 6,620 | 7,810 |
| Izod impact strength (−30° C.) | KJ/m$^2$ | 45.4 | 68.7 | 59.5 | 48.9 | 52.1 | 82.1 | 78.9 |
| Heat deflection temperature (short-term heat resistance) | ° C. | 148 | 145 | 152 | 150 | 153 | 150 | 161 |

Table 2 is a table where the test results of rigidity and short-term heat resistance of the samples manufactured based on the constitution components and the contents of Table 1 are described.

The melt index was measured at 230° C. and 2.16 kg according to the ASTM D1238 method, the density was measured at normal temperature according to the ASTM D1505 method, and tensile strength was measured at normal temperature according to the ASTM D638 method. Bending modulus of elasticity was measured at normal temperature according to the ASTM D790 method, and izod impact strength was measured at −30° C. according to the ASTM D256 method.

As a measurement result, the test results of tensile strength, bending modulus of elasticity, izod impact strength, and heat deflection temperature were generally excellent compared to the Comparative Examples without the compatibilizer. Therefore the Examples have rigidity and short-term heat resistance that were more excellent than those of the Comparative Examples. Particularly, Example 4 including nylon 6 has the most excellent physical properties among the Comparative Examples and the Examples.

Figure 3:
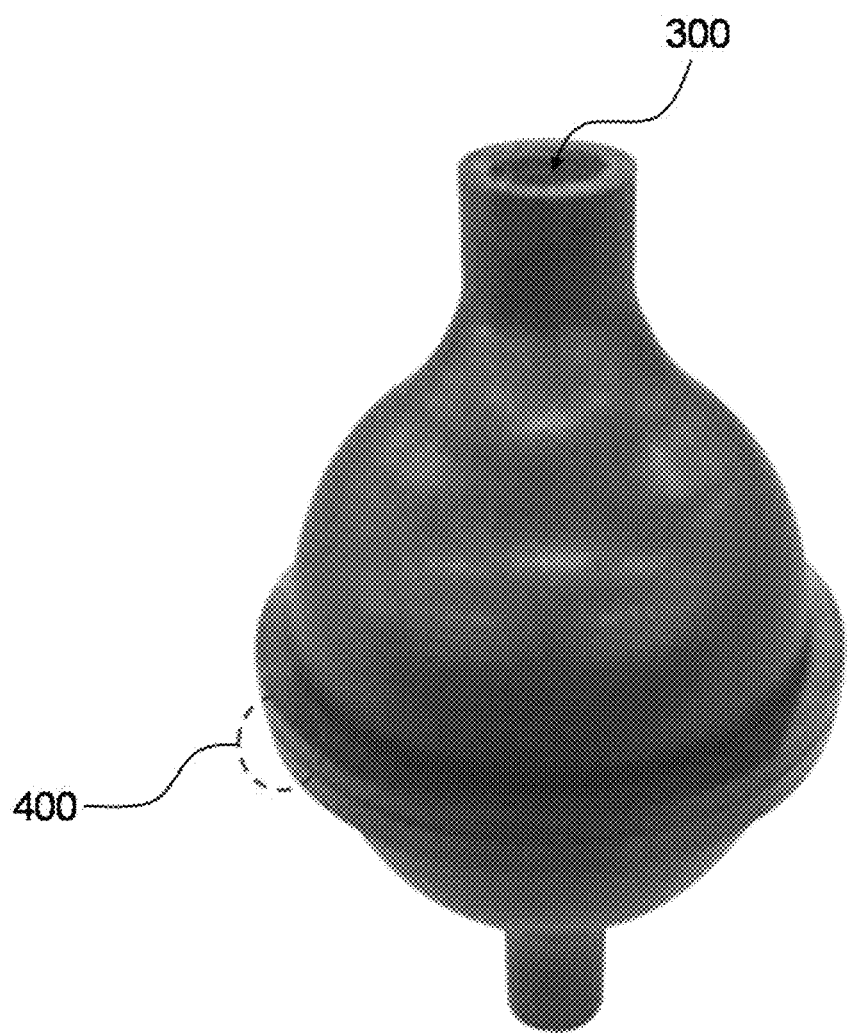
FIG. 3 is a picture of a sample for performing a fusion strength test.

FIG. 3 is a picture of the sample for the fusion strength test. In the long-term heat resistance test, a tensile rigidity maintenance ratio was measured at 130° C. after 1,000 hours, and in the fusion strength test, the fusion sample illustrated in FIG. 3 was manufactured. A bursting pressure test where a pressure at which a burst surface 400 was burst was measured by applying a pneumatic pressure or a hydraulic pressure to a hole 300 of the sample and a ball dropping test at low temperatures, in which the sample having a mass of 440 g was dropped from the height of 50 cm at −30° C., was performed, and the results were measured.

As a measurement result, Examples including the compatibilizer, all the physical property maintenance ratios had a probability of maintaining physical properties at high temperatures were 90% or more, and thus long-term heat resistance was excellent as compared to the Comparative Examples where the probability of maintaining physical properties at high temperatures was 65 to 83%. Further, in a case of the bursting pressure, the Examples endure higher pressure than that of the Comparative Examples. In the ball dropping test at low temperatures, cracks were generated in all the Comparative Examples, but cracks were not generated

TABLE 3

| Classification | Unit | Comparative Example 1 | Comparative Example 2 | Comparative Example 3 | Example 1 | Example 2 | Example 3 | Example 4 |
|---|---|---|---|---|---|---|---|---|
| Physical property maintenance ratio (long-term heat resistance) | % | 65 | 81 | 83 | 95 | 99 | 91 | 90 |
| Bursting pressure (fusion strength) | bar | 5.95 | 6.89 | 6.21 | 8.12 | 8.62 | 7.51 | 8.24 |
| Ball dropping test at low temperature (fusion strength) | — | Crack | Crack | Crack | No crack | No crack | No crack | No crack |

Table 3 describes the test results of long-term heat resistance and fusion welding strength of the samples manufactured based on the constitution components and the contents of Table 1.

in all the Examples. Therefore, fusion strength of the Examples was superior to that of the Comparative Examples.

The present disclosure has been described in relation to specific embodiments of the disclosure, but the embodiments are only illustrative and the present disclosure is not limited thereto. Embodiments described may be changed or modified by those skilled in the art to which the present disclosure pertains without departing from the scope of the present disclosure, and various alterations and modifications are possible within the technical spirit of the present disclosure and the equivalent scope of the claims which will be described below.

What is claimed is:

1. A polypropylene resin composition comprising:
   1 to 30 wt % of homopolypropylene having a melt index of 2 to 6 g/10 min at 230° C. and 2.16 kg, and an isotacticity index of 97% or more;
   1 to 40 wt % of homopolypropylene having a melt index of 16 to 22 g/10 min at 230° C. and 2.16 kg, and an isotacticity index of 96% or more;
   20 to 40 wt % of a glass fiber; and
   1 to 10 wt % of denatured polypropylene, and
   1 to 10 wt % of nylon 6,
   wherein the wt % are based on a total weight of the composition.

2. The polypropylene resin composition of claim 1, further comprising:
   1 to 20 wt % of homopolypropylene having a melt index of 8 to 12 g/10 min at 230° C. and 2.16 kg, and an isotacticity index of 96% or more;
   1 to 30 wt % of a block polypropylene copolymer having a melt index of 6 to 10 g/10 min at 230° C. and 2.16 kg, and an isotacticity index of 96%; and
   1 to 30 wt % of a block polypropylene copolymer having a melt index of 8 to 12 g/10 min at 230° C. and 2.16 kg, and an isotacticity index of 96%,
   wherein the wt % are based on a total weight of the composition.

3. The polypropylene resin composition of claim 1, further comprising:
   0.3 to 0.5 wt % of an antioxidant;
   0.3 to 0.5 wt % of a heat resistant stabilizer; and
   0.2 to 0.4 wt % of a lubricant,
   wherein the wt % are based on a total weight of the composition.

4. The polypropylene resin composition of claim 1, wherein denatured polypropylene is polypropylene (PP-graft-MA) on which maleic anhydride is grafted.

* * * * *